(12) United States Patent
Lim et al.

(10) Patent No.: US 9,114,345 B2
(45) Date of Patent: Aug. 25, 2015

(54) LOW POWER WATER FILTER MONITORING SYSTEM

(71) Applicant: General Electric Company, Schenectady, NY (US)

(72) Inventors: Tae Hoon Lim, Seongnam-si (KR); Seokki Yun, Seongnam-si (KR); Dong Soo Shin, Seoul (KR); Oliver William Staton, Louisville, KY (US)

(73) Assignee: General Electric Company, Schenectady, NY (US)

( * ) Notice: Subject to any disclaimer, the term of this patent is extended or adjusted under 35 U.S.C. 154(b) by 74 days.

(21) Appl. No.: 14/148,780

(22) Filed: Jan. 7, 2014

(65) Prior Publication Data

US 2015/0190745 A1 Jul. 9, 2015

(51) Int. Cl.
*G08B 21/00* (2006.01)
*B01D 46/00* (2006.01)

(52) U.S. Cl.
CPC ................... *B01D 46/0086* (2013.01)

(58) Field of Classification Search
CPC .................................................. B01D 46/0086
USPC .......................................................... 340/607
See application file for complete search history.

(56) References Cited

U.S. PATENT DOCUMENTS

| 6,149,801 A * | 11/2000 | Giordano et al. | 210/87 |
| 8,337,693 B2 | 12/2012 | Mitchell | |
| 2010/0308073 A1 * | 12/2010 | Devilbiss et al. | 222/1 |
| 2012/0000858 A1 | 1/2012 | Butler et al. | |
| 2012/0144855 A1 * | 6/2012 | Krause et al. | 62/331 |

* cited by examiner

*Primary Examiner* — Kerri McNally
(74) *Attorney, Agent, or Firm* — Dority & Manning, P.A.

(57) ABSTRACT

Low power water filter monitoring systems and methods of operation thereof are provided. An example water filter includes a water flow signal receiver configured to receive a water flow signal from a refrigeration appliance. The refrigeration appliance provides the water flow signal whenever water is flowing through the water filter. The water filter can monitor its lifespan based on a total amount of time the water flow signal has been received. Another example water filter includes an ambient light sensor and one or more water filter status indicators. The one or more water filter status indicators are only operated when the ambient light sensor is receiving ambient light.

20 Claims, 7 Drawing Sheets

LOW POWER WATER FILTER MONITORING SYSTEM

FIELD OF THE INVENTION

The present disclosure relates generally to a system for filtering a fluid such as water. More particularly, the present disclosure is directed to a water filter monitoring system that includes an independently-powered water filter providing multiple power-saving features.

BACKGROUND OF THE INVENTION

Fluid filter systems, particularly as used for water filtration, typically include a filter constructed with a media that removes unwanted particulates and other substances from the fluid. Filtration can be based on size exclusion, adsorption, and other mechanisms. Such filter systems can be provided as stand-alone systems installed e.g., in cabinetry or provided as part of an appliance such as a refrigerator.

As with most any filtration system, as filtered particles are captured by the filter medium over a period of time, the filter loses efficacy and generally should be periodically replaced.

For filters included in consumer appliances, replacing the filter can be a challenging task for the consumer to perform. In particular, for certain newer appliances, sophisticated features can be included to monitor filter performance and/or lifespan. If such features require power to be supplied to the filter, then replacing the filter can become even more difficult, as the consumer will be required to disconnect and then re-connect power supplies.

One solution for this problem is for the water filter to be independently powered. For example, any "smart" features included within the filter can be powered by a battery included internally within the filter body. Thus, by eliminating the need for the consumer to concern herself with disconnecting or connecting power supplies, the filter replacement process can be simplified.

However, the use of an independent power supply raises additional concerns. In particular, an independent power supply, such as, for example, a battery, can have a limited expected lifespan. Therefore, if the filter continuously operates or otherwise does not conserve power, the independent power supply will be quickly depleted, rendering the filter features ineffective.

Therefore, a need exists for an independently powered water filter that provides enhanced monitoring features while ensuring low power consumption or other power-saving features.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a water filter. The water filter includes a power supply, a controller, and a water flow signal receiver configured to receive a water flow signal from an appliance. The appliance provides the water flow signal whenever water is flowing through the water filter. The controller is configured to operate a counter to monitor a total time for which the water flow signal receiver has received the water flow signal from the appliance.

Another aspect of the present disclosure is directed to a water filter. The water filter includes a power supply, a controller, an ambient light sensor, and one or more water filter status indicators. The controller is configured to perform operations when ambient light is received by the ambient light sensor. The operations include determining a status of the water filter. The operations include operating the one or more water filter status indicators to indicate the water filter status.

Another aspect of the present disclosure is directed to a method for operating a water filter included in a refrigeration appliance. The water filter has a power supply that is independent from the refrigeration appliance. The method includes receiving ambient light at a light sensor of the water filter. The method includes determining a usage amount associated with the water filter when the ambient light is received at the light sensor. The usage amount is indicative of an expected remaining lifespan associated with the water filter. The method includes operating one or more water filter status indicators based at least in part on the determined usage amount when the ambient light is received at the light sensor. The method includes ceasing to operate the one or more water filter status indicators when the ambient light is no longer received at the light sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
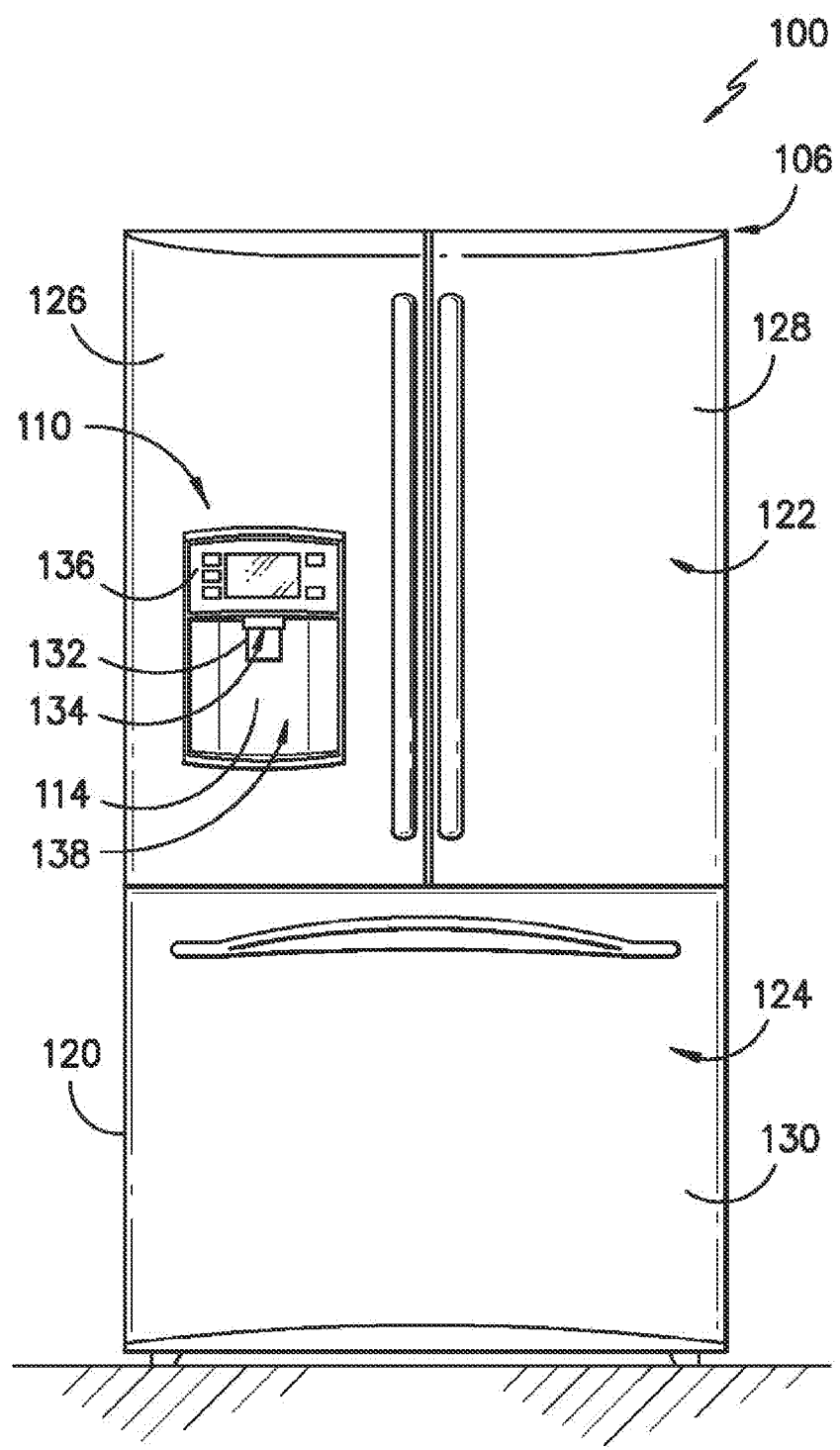
FIG. 1 depicts a front view of an exemplary refrigerator appliance as may be equipped with a fluid filter system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100 as may be equipped with an exemplary fluid filter system of the present invention. However, as will be understood using the teachings disclosed herein, the fluid filter system of the present disclosure may be used with other refrigerator appliance configurations as well as other types of appliances. It may also be used in applications other than appliances as well. For example, the filtering system of the present invention could be installed under a kitchen sink or as part of a whole housing filtration system. As such, refrigerator appliance 100 is provided only by way of example of an application of the exemplary fluid filtration system of the present disclosure.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
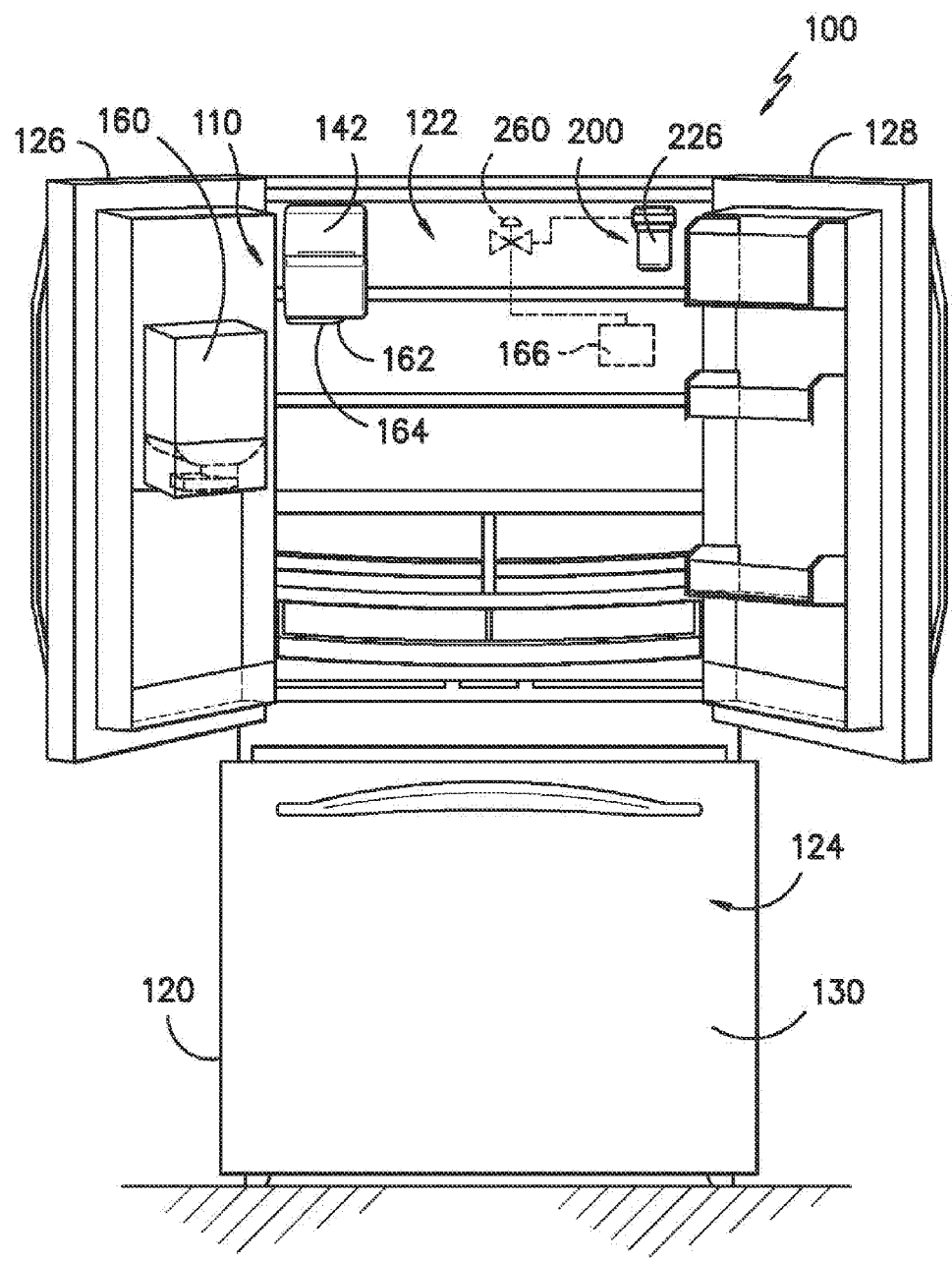
FIG. 2 depicts a front view of the refrigerator appliance of FIG. 1 with refrigerator doors in an open position.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary fluid filter assembly or fluid filter system 200 that filters water coming into refrigerator appliance 100 from a water supply (not shown), such as a municipal water source or a well. In some embodiments, fluid filter system 200 can include a replaceable filter body 226. One or more filtering media can be included in filter body 226.

Fluid filtration system 200 can remove contaminants, such as chlorine, chloroform, lead, arsenic, pharmaceuticals, microbes, and/or other undesirable substances, from water supplied to refrigerator appliance 100. In particular, fluid filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

The flow of water through fluid filter system 200 can be controlled by controller 166 or by other components or processes of refrigeration appliance 100. As an example, controller 166 can control the flow of water through fluid filter system 200 through the use of a valve 260. Thus, controller 166 can have knowledge of when water is flowing through fluid filter system 200.

For this exemplary embodiment, fluid filtration system 200 is shown positioned within fresh food chamber 122. However, fluid filtration system 200 may also be located in other locations as well. Also, as stated above, filter assembly 200 could also be located under a sink, configured as part of a whole house filtration system, or otherwise configured for other applications as well.

Figure 3:
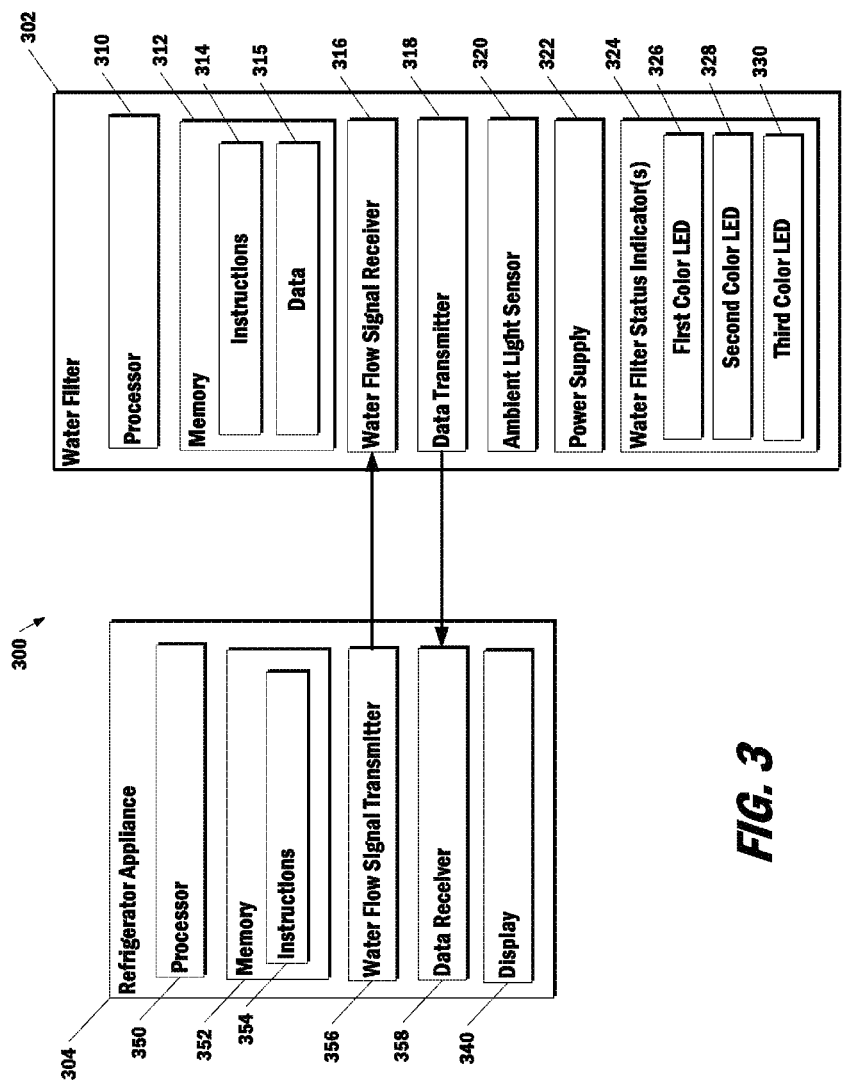
FIG. 3 depicts an exemplary water filter system according to an exemplary embodiment of the present disclosure.

FIG. 3 depicts an exemplary water filter system 300 according to an exemplary embodiment of the present disclosure. In particular, system 300 can include a water filter 302 operably installed within and in communication with a refrigerator appliance 304.

Processor 310 can be one processor or can be multiple processors operably connected. In some implementations, processor 310 can be a controller or a microcontroller. For example, processor 310 can be an ultra-low power Epson® MCU.

Memory 312 can be any suitable form of memory, including, for example, random access memory such as DRAM, or read only memory such as ROM or FLASH. Memory 312 can store instructions 314 that, when executed by processor 310, cause water filter 302 to perform operations in accordance with aspect of the present disclosure.

Memory 312 can also include data 315. As an example, processor 310 can compute usage data describing an amount of usage the water filter 302 has experienced. The usage data can be stored in data 315. As another example, processor 310 can operate one or more counters to collect lifespan information about water filter 302. The counter values can be stored in data 315.

Likewise, refrigerator appliance 304 can include a processor 350 and a memory 352 that stores instructions 354 that, when executed by processor 350, cause refrigerator appliance 304 to perform operations in accordance with the present disclosure.

According to an aspect of the present disclosure, water filter 302 can also include a water flow signal receiver 316. Water flow signal receiver 316 can be any device, instrument, component, or sensor that is configured to receive a water flow signal from refrigerator appliance 304. In particular, water flow signal receiver 316 can receive the water flow signal from a water flow signal transmitter 356 included in refrigerator appliance 304.

According to another aspect of the present disclosure, refrigerator appliance 304 can provide the water flow signal to water filter 302 whenever water is flowing through water filter 302. In particular, in some implementations, water filter 302 can be a passive component of the overall water dispensing system of refrigerator appliance 304.

As such, whenever operations performed by refrigerator appliance 304 cause water to flow through water filter 302, then refrigerator appliance 304 can operate water flow signal transmitter 356 to provide the water flow signal to water flow signal receiver 316. Example operations that cause water to flow through water filter 302 can include dispensing of water to a user, filling an internal water tank, and/or supplying water to an icemaker for the creation of ice. In such fashion, water filter 302 can keep track of the amount of time water has flowed through itself.

As an example, in some implementations, water flow signal receiver 316 can be a light sensor. For example, water flow signal receiver 316 can be cadmium sulfide photoresistor. Thus, in such implementations, water flow signal transmitter 356 can be a light source, such as, for example, a light emitting diode (LED). Therefore, when refrigerator appliance 304 desires to provide the water flow signal, refrigerator appliance 304 can illuminate the LED and cause light to be received by the photoresistor.

As another example, in some implementations, water flow signal receiver 316 can be an infrared receiver. Thus, in such implementations, water flow signal transmitter 356 can be an infrared transmitter. Therefore, when refrigerator appliance 304 desires to provide the water flow signal, refrigerator appliance 304 can operate the infrared transmitter to provide an infrared signal to the infrared receiver.

Other methods of signal transmission and reception can be performed by water flow signal transmitter 356 and water flow signal receiver 316 as well, such as, for example, radio frequency communication, near-field communication, inductive coupling, or any other suitable forms of signal communication.

According to an aspect of the present disclosure, processor 310 can be configured to initialize a counter upon water flow signal receiver 316 receiving the water flow signal from water flow signal transmitter 356. The counter can monitor a total amount of time that the water flow signal receiver 316 has received the water flow signal from refrigerator appliance 304. As will be discussed further below, such total time of water flow can be used to calculate or otherwise determine a usage amount associated with water filter 302. For example, counter values can be stored in data 315.

According to another aspect of the present disclosure, water filter 302 can also include a data transmitter 318. Data transmitter 318 can transmit usage data or other suitable data to a data receiver 358 of refrigerator appliance. For example, transmitted data can include remaining expected life of power supply 322, usage data, serial number, part number, model number, update information, fault information, or any other suitable information.

Data received by refrigerator appliance 304 from water filter 302, such as, for example, usage data, can be displayed on a display 340 for presentation to a user. For example, display 340 can be a liquid-crystal display or other suitable form of display.

Communications between data transmitter 318 and data receiver 358 can be encrypted according to any encryption procedure or can implement other forms of security or validation.

In some implementations, data transmitter 318 can be an infrared transmitter. Thus, in such implementations, data receiver 358 can be an infrared receiver. In addition, in some implementations, communication between data transmitter 318 and data receiver 358 can be two-way in nature.

Other methods of signal transmission and reception can be performed by data transmitter 318 and data receiver 358 as well, such as, for example, radio frequency communication, near-field communication, fiber optical communication, or any other suitable forms of signal communication.

According to another aspect of the present disclosure, water filter 302 can actively transmit data to refrigerator appliance 304 via data transmitter 318 upon receiving the water flow signal. Thus, data transmission can occur while the water flow signal is being received. Once data transmission is completed and/or the water flow signal is no longer received, power to data transmitter 318 can be ended, so that water filter 302 does not drain the power supply 322.

According to yet another aspect of the present disclosure, water filter 302 can include an ambient light sensor 320. Ambient light sensor 320 can be any device, component, sensor, or instrument for detecting the presence or existence of ambient light around the water filter 302. As an example, ambient light sensor 320 can be a cadmium sulfide photoresistor.

The ambient light detected by ambient light sensor 320 can come from one or more sources. For example, refrigerator appliance 304 can include one or more lighting devices that are illuminated when a door of refrigerator appliance 304 is opened. Therefore, when the door is opened and the lighting devices are illuminated, ambient light sensor 320 will receive or detect ambient light.

Additionally or alternatively, when a door to refrigerator appliance 304 is opened, light from the exterior of the appliance 304 may enter into the compartment in which water filter 302 is positioned. Therefore, when the door is opened and light enters the appliance, ambient light sensor 320 will receive or detect ambient light.

According to another aspect of the present disclosure, when ambient light sensor 320 receives ambient light, processor 310 can operate one or more water filter status indicators 324 to indicate a status of the water filter to a user. In such fashion, operation of the water filter status indicators 324 can be limited to instances in which the door to the refrigerator is open and the water filter status indicators are visible to a user, thereby conserving power.

Water filter status indicator(s) 324 can include any device or component for providing an indication of a status of the water filter. For example, the indication can be audio, visual, or haptic in nature.

In some implementations, the water filter status indicators 324 are three light emitting diodes (LEDs). For example, water filter status indicators 324 can include a first color LED 326 (e.g., blue), a second color LED 328 (e.g., green), and a third color LED 330 (e.g., red).

Power supply 322 can be any suitable component for supplying power to water filter 302. In particular, power supply 322 can be independent from refrigeration appliance 304. As an example, power supply 322 can be a battery.

Power supply 322 can have an expected lifespan. The expected lifespan can be expressed in any suitable units, including a length of time or an amount of current (e.g. mA) that power supply 322 can provide over its lifespan. In some implementations, power supply 322 is chosen or otherwise designed so that its expected lifespan correlates with the expected lifespan of the filtering media included in water filter 302.

Figure 4:
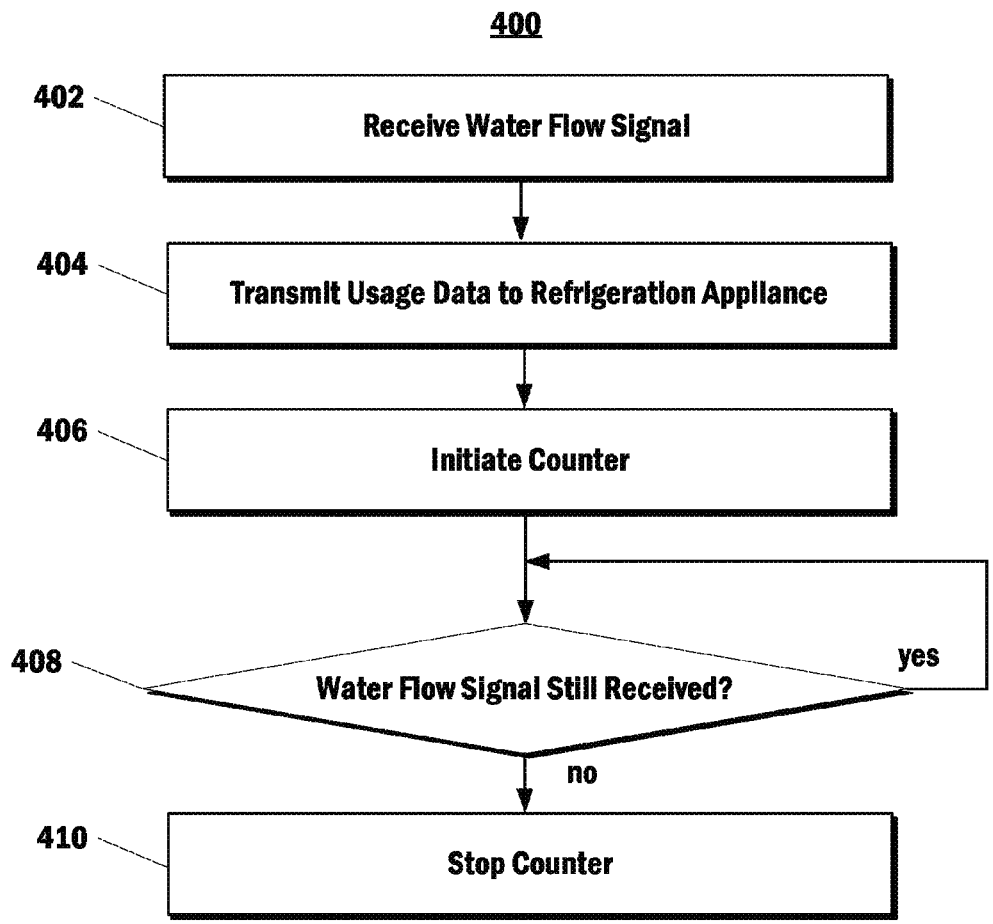
FIG. 4 depicts a flow chart of an exemplary method for operating a water filter according to an exemplary embodiment of the present disclosure.

FIG. 4 depicts a flow chart of an exemplary method (400) for operating a water filter according to an exemplary embodiment of the present disclosure. Although method (400) will be discussed with reference to system 300 of FIG. 3, method (400) can be performed by any suitable computing system.

In addition, FIG. 4 depicts steps performed in a particular order for purposes of illustration and discussion. Those of ordinary skill in the art, using the disclosures provided herein, will understand that the various steps method (400) can be omitted, adapted, and/or rearranged in various ways without departing from the scope of the present disclosure.

At (402) a water flow signal can be received. For example, water flow signal receiver 316 can receive the water flow signal from water flow signal transmitter 356. As an example, refrigerator appliance 304 may be dispensing water to a user, thereby causing water to flow through water filter 302. As such, refrigerator appliance 304 can provide the water flow signal to water flow signal receiver 316.

At (404) usage data can be transmitted to a refrigeration appliance. For example, water filter 302 can operate data transmitter 318 to transmit data to data receiver 358. Transmitted data can include remaining expected life of power supply 322, usage data, serial number, part number, model number, update information, fault information, or any other suitable information.

At (406) a counter can be initiated. For example, processor 310 can initiate a counter to monitor a total time for which water filter 302 has received the water flow signal. As an example, the counter can be initialized to zero and count upwards with the count then being added to an existing counter value. As another example, the counter can be re-initialized at a previous count that was previously reached.

At (408) it can be determined whether the water flow signal is still being received. If it is determined at (408) that water flow signal is still being received, then method (400) can return to (408) and continue waiting for the flow signal to cease being received.

However, if it is determined at (408) that the water flow signal is no longer being received, then method (400) can proceed to (410). At (410) the counter can be stopped. The value of the counter at the time that the water flow signal ceased to be received can be stored in memory.

Figure 5:
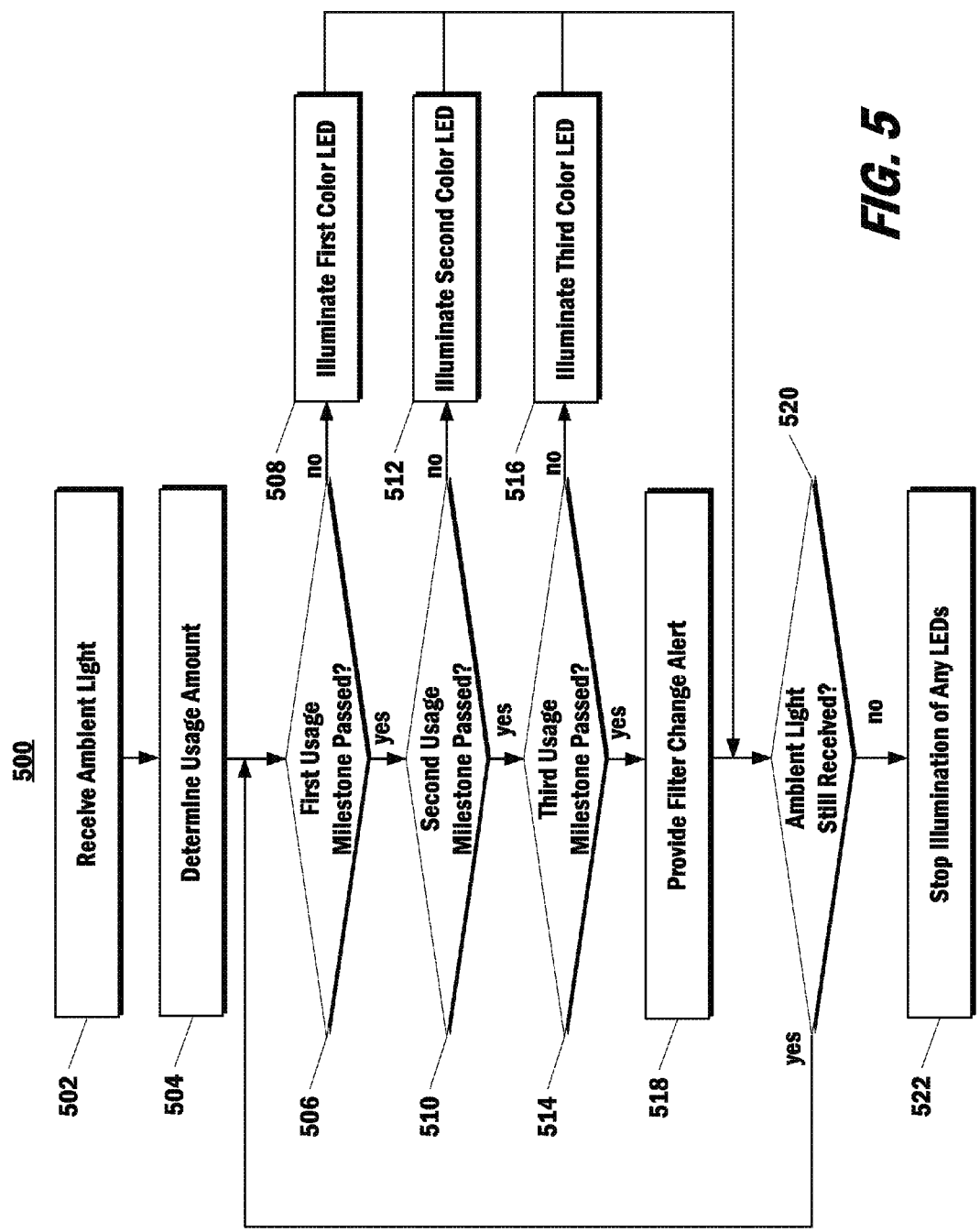
FIG. 5 depicts a flow chart of an exemplary method for operating a water filter according to an exemplary embodiment of the present disclosure.

FIG. 5 depicts a flow chart of an exemplary method (500) for operating a water filter according to an exemplary embodiment of the present disclosure. Although method (500) will be discussed with reference to system 300 of FIG. 3, method (500) can be performed by any suitable water filter system, including water filter system 600 of FIG. 6.

In addition, FIG. 5 depicts steps performed in a particular order for purposes of illustration and discussion. Those of ordinary skill in the art, using the disclosures provided herein, will understand that the various steps method (500) can be omitted, adapted, and/or rearranged in various ways without departing from the scope of the present disclosure.

At (502) ambient light can be received. For example, a door to refrigeration appliance 304 can have been opened and, therefore, ambient light is received by ambient light sensor 320.

At (504) a usage amount associated with the water filter can be determined. In particular, the usage amount can be indicative of an expected remaining lifespan associated with the water filter. In some implementations, the usage amount can be determined based on the total time for which the water flow signal receiver has received the water flow signal from the appliance, a door open count indicating the number of times the door to the appliance has been opened, and/or a total time for which the ambient light sensor has received ambient light.

At (506) it can be determined whether a first usage milestone has been passed. For example, the usage amount determined at (504) can be compared to a first threshold value. The first threshold value can be predetermined based on the total expected lifespan of the water filter and can be retrieved from memory.

If it is determined at (506) that the first usage milestone has not been passed, then method (500) can proceed to (508) and illuminate a first color LED (e.g., blue). After (508), method (500) can proceed to (520).

However, if it is determined at (506) that the first usage milestone has been passed, then method (500) can proceed to (510).

At (510) it can be determined whether a second usage milestone has been passed. For example, the usage amount determined at (504) can be compared to a second threshold value. The second threshold value can be predetermined based on the total expected lifespan of the water filter and can be retrieved from memory.

If it is determined at (510) that the second usage milestone has not been passed, then method (500) can proceed to (512) and illuminate a second color LED (e.g., green). After (512), method (500) can proceed to (520).

However, if it is determined at (510) that the first usage milestone has been passed, then method (500) can proceed to (514).

At (514) it can be determined whether a third usage milestone has been passed. For example, the usage amount determined at (504) can be compared to a third threshold value. The third threshold value can be predetermined based on the total expected lifespan of the water filter and can be retrieved from memory.

If it is determined at (514) that the third usage milestone has not been passed, then method (500) can proceed to (516) and illuminate a third color LED (e.g., red). After (516), method (500) can proceed to (520).

However, if it is determined at (514) that the first usage milestone has been passed, then method (500) can proceed to (518).

At (518) a filter change alert can be provided. For example, the filter change alert can be provided by failing to illuminate any of the LEDs. As another example, the filter change alert can be provided by producing an audible alarm or flashing the LEDs periodically.

As yet another example, the filter change alert can be provided by transmitting an alert notification to the refrigerator appliance 304. The refrigerator appliance 304 can then display the filter change alert on the display 340 of the refrigerator appliance 304.

At (520) it can be determined whether ambient light is still being received. If it is determined that ambient light is still being received, then method (500) can return to (506). Alternatively, method (500) can return to (504) and re-compute the usage amount.

However, if it is determined at (520) that ambient light is no longer being received, then method (500) can proceed to (522). For example, the door to the refrigerator appliance 304 can have been closed so that sufficient ambient light no longer exists.

At (526) illumination of any LEDs can be stopped. Thus, power can be conserved by limiting operation of the status indicator LEDs to times in which ambient light is received and, therefore, the water filter is visible to a user.

Figure 6:
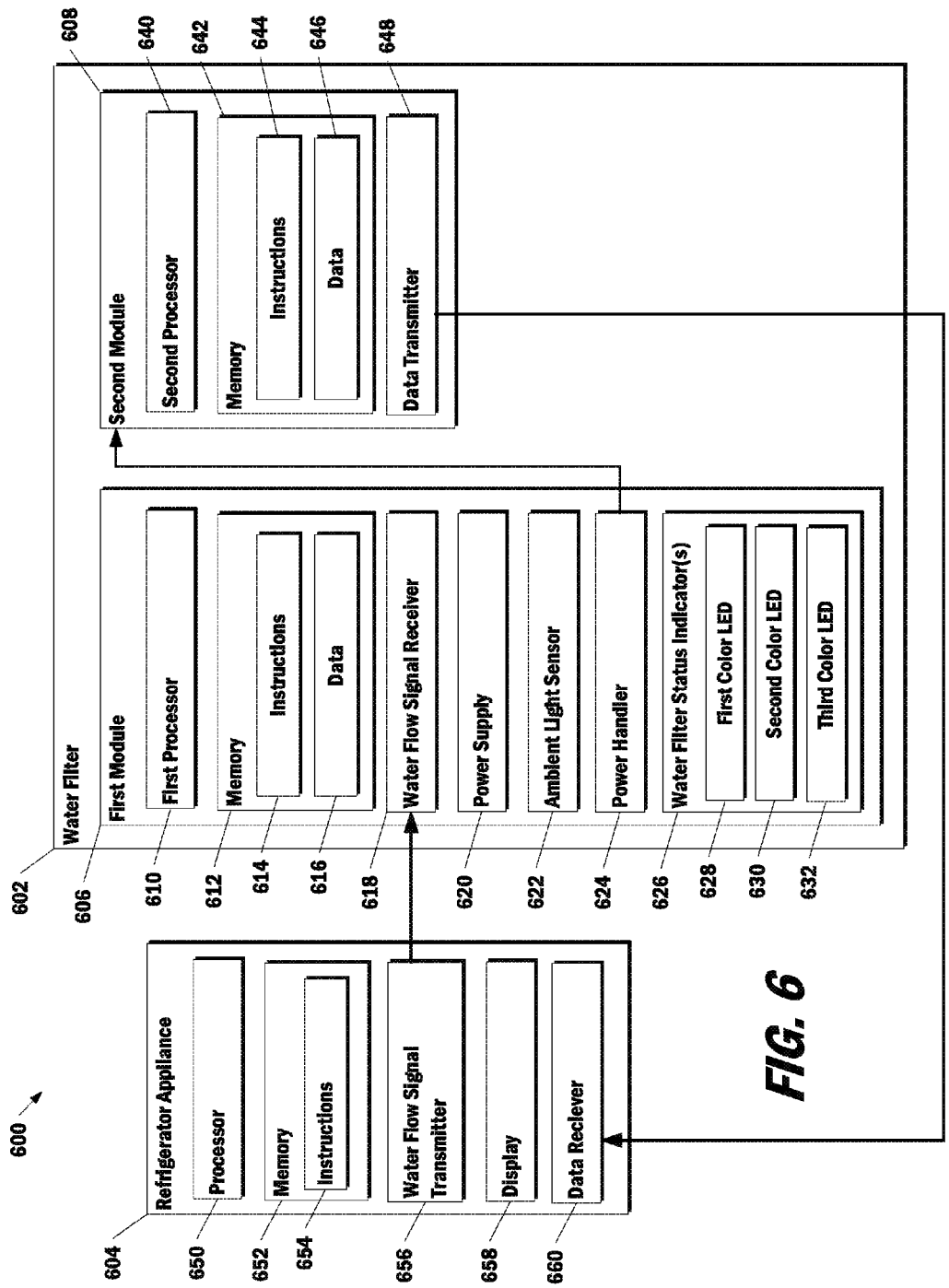
FIG. 6 depicts an exemplary water filter system according to an exemplary embodiment of the present disclosure.

FIG. 6 depicts an exemplary water filter system 600 according to an exemplary embodiment of the present disclosure. In particular, system 600 can include a water filter 602 operably installed within and in communication with a refrigerator appliance 604. Water filter 602 can include a first module 606 and a second module 608.

First module 606 can include a first processor 610. First processor 610 can be one processor or can be multiple processors operably connected. In some implementations, first processor 610 can be a controller or a microcontroller. For example, first processor 610 can be an ultra-low power Epson® MCU.

Memory 612 can be any suitable form of memory, including, for example, random access memory such as DRAM, or read only memory such as ROM or FLASH. Memory 612 can store instructions 614 that, when executed by first processor 610, cause water filter 602 to perform operations in accordance with aspect of the present disclosure.

Memory 612 can also include data 616. As an example, first processor 610 can compute usage data describing an amount of usage the water filter 602 has experienced. The usage data can be stored in data 616. As another example, first processor 610 can operate one or more counters to collect lifespan information about water filter 602. The counter values can be stored in data 616.

Likewise, refrigerator appliance 304 can include a processor 650 and a memory 652 that stores instructions 654 that, when executed by processor 650, cause refrigerator appliance 604 to perform operations in accordance with the present disclosure.

According to an aspect of the present disclosure, water filter 602 can also include a water flow signal receiver 618. Water flow signal receiver 618 can be any device, instrument, component, or sensor that is configured to receive a water flow signal from refrigerator appliance 604. In particular, water flow signal receiver 618 can receive the water flow signal from a water flow signal transmitter 656 included in refrigerator appliance 604.

According to another aspect of the present disclosure, refrigerator appliance 604 can provide the water flow signal to water filter 602 whenever water is flowing through water filter 602. In particular, in some implementations, water filter 602 can be a passive component of the overall water dispensing system of refrigerator appliance 604.

As such, whenever operations performed by refrigerator appliance 604 cause water to flow through water filter 602, then refrigerator appliance 604 can operate water flow signal transmitter 656 to provide the water flow signal to water flow signal receiver 618. Example operations that cause water to flow through water filter 602 can include dispensing of water to a user, filling an internal water tank, and/or supplying water to an icemaker for the creation of ice. In such fashion, water filter 602 can keep track of the amount of time water has flowed through itself.

As an example, in some implementations, water flow signal receiver 618 can be a light sensor. For example, water flow signal receiver 618 can be cadmium sulfide photoresistor. Thus, in such implementations, water flow signal transmitter 656 can be a light source, such as, for example, a light emitting diode (LED). Therefore, when refrigerator appliance 604 desires to provide the water flow signal, refrigerator appliance 604 can illuminate the LED and cause light to be received by the photoresistor.

As another example, in some implementations, water flow signal receiver 618 can be an infrared receiver. Thus, in such implementations, water flow signal transmitter 656 can be an infrared transmitter. Therefore, when refrigerator appliance 604 desires to provide the water flow signal, refrigerator appliance 604 can operate the infrared transmitter to provide an infrared signal to the infrared receiver.

Other methods of signal transmission and reception can be performed by water flow signal transmitter 656 and water flow signal receiver 618 as well, such as, for example, radio frequency communication, near-field communication, inductive coupling, or any other suitable forms of signal communication.

According to an aspect of the present disclosure, processor 610 can be configured to initialize a counter upon water flow signal receiver 618 receiving the water flow signal from water flow signal transmitter 656. The counter can monitor a total amount of time that the water flow signal receiver 618 has received the water flow signal from refrigerator appliance 604. As will be discussed further below, such total time of water flow can be used to calculate or otherwise determine a usage amount associated with water filter 602. For example, counter values can be stored in data 616.

According to another aspect of the present disclosure, first module 606 can be configured to provide power to second module 608 when the water flow signal is received by water flow signal receiver 618. In particular, when the water flow signal is received, a power handler 624 can be operated to provide power from power supply 620 to second module 608. Therefore, second module 608 can be selectively powered via power handler 624 when the water flow signal is received.

As an example, power handler 624 can be a semiconductor device or other switching device positioned between power supply 620 and the power input for second module 608. For example, power handler 624 can be a field effect transistor positioned between power supply 620 and a second processor 640. When water flow signal receiver 618 receives the water flow signal, it can cause power handler 624 to allow the flow of power from power supply 620 to second processor 640. For example, first processor 620 can receive input from water flow signal receiver 618 and operate power handler 624.

Second module 608 can include second processor 640 and a memory 642. Second processor 640 can be one processor or can be multiple processors operably connected. In some implementations, second processor 640 can be a controller or a microcontroller. For example, second processor 640 can be an ultra-low power Epson® MCU.

Memory 642 can be any suitable form of memory, including, for example, random access memory such as DRAM, or read only memory such as ROM or FLASH. Memory 642 can store instructions 644 that, when executed by second processor 640, cause water filter 602 to perform operations in accordance with aspect of the present disclosure.

Memory 642 can also include data 646. As an example, in some implementations, second processor 640 can compute usage data describing an amount of usage the water filter 602 has experienced. The usage data can be stored in data 646. As another example, second processor 640 can operate one or more counters to collect lifespan information about water filter 602. The counter values can be stored in data 646.

According to another aspect of the present disclosure, second module 608 can also include a data transmitter 648. Data transmitter 648 can transmit usage data or other suitable data to a data receiver 660 of refrigerator appliance. For example, transmitted data can include remaining expected life of power supply 620, usage data, serial number, part number, model number, update information, fault information, or any other suitable information.

Data received by refrigerator appliance 604 from water filter 602, such as, for example, usage data, can be displayed on a display 658 for presentation to a user. For example, display 658 can be a liquid-crystal display or other suitable form of display.

Communications between data transmitter 648 and data receiver 660 can be encrypted according to any encryption procedure or can implement other forms of security or validation.

In some implementations, data transmitter 648 can be an infrared transmitter. Thus, in such implementations, data receiver 660 can be an infrared receiver. In addition, in some implementations, communication between data transmitter 648 and data receiver 660 can be two-way in nature.

Other methods of signal transmission and reception can be performed by data transmitter 648 and data receiver 660 as well, such as, for example, radio frequency communication, near-field communication, fiber optical communication, or any other suitable forms of signal communication.

According to another aspect of the present disclosure, second processor 640 can actively transmit data to refrigerator appliance 604 via data transmitter 648 upon receiving the water flow signal. Thus, data transmission can occur while the water flow signal is being received. Once data transmission is completed and/or the water flow signal is no longer received, power to second processor 640 and data transmitter 648 can be ended, so that water filter 302 does not drain the power supply 620.

According to yet another aspect of the present disclosure, first module 606 can include an ambient light sensor 622. Ambient light sensor 622 can be any device, component, sensor, or instrument for detecting the presence or existence of ambient light around the water filter 602. As an example, ambient light sensor 622 can be a cadmium sulfide photoresistor.

The ambient light detected by ambient light sensor 622 can come from one or more sources. For example, refrigerator appliance 604 can include one or more lighting devices that are illuminated when a door of refrigerator appliance 604 is opened. Therefore, when the door is opened and the lighting devices are illuminated, ambient light sensor 622 will receive or detect ambient light.

Additionally or alternatively, when a door to refrigerator appliance 604 is opened, light from the exterior of the appliance 604 may enter into the compartment in which water filter 602 is positioned. Therefore, when the door is opened and light enters the appliance, ambient light sensor 622 will receive or detect ambient light.

According to another aspect of the present disclosure, when ambient light sensor 622 receives ambient light, first processor 606 can operate one or more water filter status indicators 626 to indicate a status of the water filter to a user. In such fashion, operation of the water filter status indicators 626 can be limited to instances in which the door to the refrigerator is open and the water filter status indicators are visible to a user, thereby conserving power.

Water filter status indicator(s) 626 can include any device or component for providing an indication of a status of the water filter. For example, the indication can be audio, visual, or haptic in nature.

In some implementations, the water filter status indicators 626 are three light emitting diodes (LEDs). For example, water filter status indicators 626 can include a first color LED 628 (e.g., blue), a second color LED 630 (e.g., green), and a third color LED 632 (e.g., red).

Power supply 620 can be any suitable component for supplying power to water filter 602. In particular, power supply 620 can be independent from refrigeration appliance 604. As an example, power supply 620 can be a battery.

Power supply 620 can have an expected lifespan. The expected lifespan can be expressed in any suitable units, including a length of time or an amount of current (e.g. mA) that power supply 620 can provide over its lifespan. In some implementations, power supply 620 is chosen or otherwise designed so that its expected lifespan correlates with the expected lifespan of the filtering media included in water filter 602.

Figure 7:
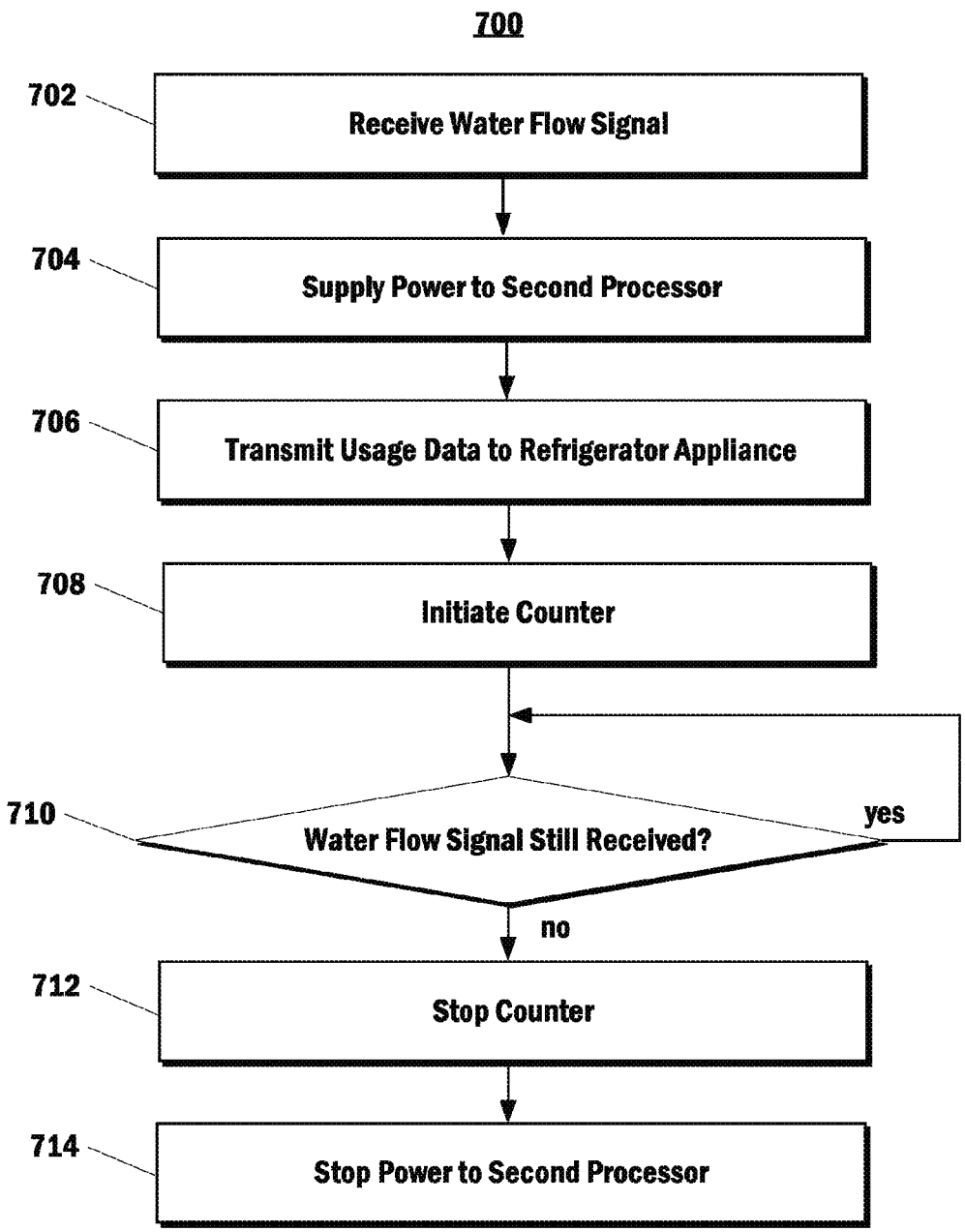
FIG. 7 depicts a flow chart of an exemplary method for operating a water filter according to an exemplary embodiment of the present disclosure.

FIG. 7 depicts a flow chart of an exemplary method (700) for operating a water filter according to an exemplary embodiment of the present disclosure. Although method (700) will be discussed with reference to system 600 of FIG. 6, method (700) can be performed by any suitable water filter system.

In addition, FIG. 7 depicts steps performed in a particular order for purposes of illustration and discussion. Those of ordinary skill in the art, using the disclosures provided herein, will understand that the various steps method (700) can be omitted, adapted, and/or rearranged in various ways without departing from the scope of the present disclosure.

At (702) a water flow signal can be received. For example, water flow signal receiver 618 can receive the water flow signal from water flow signal transmitter 656. As an example, refrigerator appliance 604 may be dispensing water to a user, thereby causing water to flow through water filter 602. As such, refrigerator appliance 604 can provide the water flow signal to water flow signal receiver 618.

At (704) power can be supplied to a second processor of the water filter. For example, upon receiving the water flow signal, water flow signal receiver 618 can cause power to be supplied from power supply 620 to second processor 640. As an example, first processor 610 can operate power handler 624 to provide power to second module 608.

At (706) usage data can be transmitted to a refrigeration appliance. For example, second processor 640 can operate data transmitter 648 to transmit data to data receiver 660. Transmitted data can include remaining expected life of power supply 620, usage data, serial number, part number, model number, update information, fault information, or any other suitable information.

At (708) a counter can be initiated. For example, first processor 610 and/or second processor 640 can initiate a counter to monitor a total time for which water filter 602 has received the water flow signal. As an example, the counter can be initialized to zero and count upwards with the count then being added to an existing counter value. As another example, the counter can be re-initialized at a previous count that was previously reached.

At (710) it can be determined whether the water flow signal is still being received. If it is determined at (710) that water flow signal is still being received, then method (700) can return to (710) and continue waiting for the water flow signal to cease being received.

However, if it is determined at (710) that the water flow signal is no longer being received, then method (700) can proceed to (412). At (712) the counter can be stopped. The value of the counter at the time that the water flow signal ceased to be received can be stored in memory.

At (714) power to the second processor can be stopped. Thus, power can be conserved by limiting operation of second processor 640 and data transmitter 648 to times in which the water flow signal is received.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter comprising:
    a power supply;
    a controller;
    a water flow signal receiver configured to receive a water flow signal from an appliance;
    wherein the appliance provides the water flow signal whenever water is flowing through the water filter; and
    wherein the controller is configured to operate a counter to monitor a total time for which the water flow signal receiver has received the water flow signal from the appliance.

2. The water filter of claim 1, wherein the water flow signal receiver comprises a light sensor, and wherein the appliance provides the water flow signal to the water filter by illuminating a lighting device such that light from the lighting device is received by the light sensor.

3. The water filter of claim 1, wherein the water flow signal receiver comprises an infrared receiver, and wherein the appliance provides the water flow signal to the water filter by transmitting an infrared signal to the infrared receiver.

4. The water filter of claim 1, further comprising:
    an ambient light sensor; and
    one or more water filter status indicators;
    wherein the controller is configured to operate the one or more water filter status indicators when ambient light is received by the ambient light sensor; and
    wherein the controller is configured operate the one or more water filter status indicators by performing operations, the operations comprising:
        determining a status of the water filter; and
        operating the one or more water filter status indicators to indicate the water filter status.

5. The water filter of claim 4, wherein the controller determines the status of the water filter based at least in part on the total time for which the water flow signal receiver has received the water flow signal from the appliance.

6. The water filter of claim 4, wherein the controller does not operate the one or more water filter status indicators unless ambient light is received by the ambient light sensor.

7. The water filter of claim 1, further comprising a data transmitter configured to transmit water filter usage data to the appliance, wherein the water filter usage data comprises the total time for which the water flow signal receiver has received the water flow signal from the appliance.

8. The water filter of claim 7, further comprising a second controller configured to operate the data transmitter, wherein the water flow signal receiver is configured to cause power to be supplied to the second controller when the water flow signal is received from the appliance, and wherein the second controller does not receive power when the water flow signal is not received from the appliance.

9. A water filter comprising:
    a power supply;
    a controller;
    an ambient light sensor; and
    one or more water filter status indicators;
    wherein the controller is configured to perform operations when ambient light is received by the ambient light sensor, the operations comprising:
        determining a status of the water filter; and
        operating the one or more water filter status indicators to indicate the water filter status.

10. The water filter of claim 9, wherein the one or more water filter status indicators are not operated unless the ambient light sensor is receiving ambient light.

11. The water filter of claim 9, wherein the one or more water filter status indicators comprise a first light emitting diode that emits a first color when illuminated, a second light emitting diode that emits a second color when illuminated, and a third light emitting diode that emits a third color when illuminated.

12. The water filter of claim 9, wherein:
determining the status of the water filter comprises determining a usage amount, wherein the usage amount is based at least in part on an expected remaining lifespan of the power supply; and
operating the one or more water filter status indicators to indicate the water filter status comprises operating the one or more water filter status indicators based at least in part of the usage amount.

13. The water filter of claim 9, further comprising:
a water flow signal receiver configured to receive a water flow signal from an appliance;
wherein the appliance provides the water flow signal whenever water is flowing through the water filter; and
wherein the controller is configured to operate a counter to monitor a total time for which the water flow signal receiver has received the water flow signal from the appliance.

14. The water filter of claim 13, wherein:
determining the status of the water filter comprises calculating a usage amount, wherein the usage amount is calculated based at least in part on the total time for which the water flow signal receiver has received the water flow signal from the appliance and a current consumption amount associated with the one or more water filter status indicators; and
operating the one or more water filter status indicators to indicate the water filter status comprises operating the one or more water filter status indicators based at least in part of the usage amount.

15. The water filter of claim 13, further comprising:
a data transmitter; and
a second controller;
wherein the water flow signal receiver is configured to cause power to be supplied to the second controller when the water flow signal receiver receives the water flow signal from the appliance; and
wherein the second controller is configured to operate the data transmitter to transmit usage data to the appliance when it receives power.

16. A method for operating a water filter included in a refrigeration appliance, the water filter having a power supply that is independent from the refrigeration appliance, the method comprising:
receiving ambient light at a light sensor of the water filter;
when the ambient light is received at the light sensor, determining a usage amount associated with the water filter, wherein the usage amount is indicative of an expected remaining lifespan associated with the water filter;
when the ambient light is received at the light sensor, operating one or more water filter status indicators based at least in part on the determined usage amount; and
when the ambient light is no longer received at the light sensor, ceasing to operate the one or more water filter status indicators.

17. The method of claim 16, further comprising:
receiving a water flow signal at a water flow signal receiver of the water filter, wherein the refrigeration appliance provides the water flow signal to the water filter when water is flowing through the water filter; and
when the water flow signal is received at the water flow signal receiver, initializing a counter;
wherein the counter counts a total time for which the water flow signal has been received at the water flow signal receiver; and
wherein determining the usage amount associated with the water filter comprises determining the usage amount associated with the water filter based at least in part on the total time for which the water flow signal has been received at the water flow signal receiver.

18. The method of claim 17, further comprising, when the water flow signal is received at the water flow signal receiver, transmitting the usage amount to the refrigeration appliance using a data transmitter of the water filter.

19. The method of claim 16, wherein operating one or more water filter status indicators based at least in part on the determined usage amount comprises:
determining whether the water filter has exceeded a first usage milestone based at least in part on the usage amount;
illuminating a first light emitting diode when it is determined that the water filter has not exceeded the first usage milestone;
when it is determined that the water filter has exceeded the first usage milestone, determining whether the water filter has exceeded a second usage milestone based at least in part on the usage amount;
illuminating a second light emitting diode when it is determined that the water filter has exceed the first usage milestone but has not exceeded the second usage milestone;
when it is determined that the water filter has exceeded the second usage milestone, determining whether the water filter has exceed a third usage milestone based at least in part on the usage amount; and
illuminating a third light emitting diode when it is determined that the water filter has exceed the second usage milestone but has not exceeded the third usage milestone.

20. The method of claim 16, further comprising:
receiving a water flow signal at a water flow signal receiver of the water filter, wherein the refrigeration appliance provides the water flow signal to the water filter when water is flowing through the water filter; and
in response to receiving the water flow signal at the water flow signal receiver, causing power to be provided to a second controller;
wherein the second controller operates a data transmitter to transmit data to the refrigeration appliance.

\* \* \* \* \*